US011750461B2

(12) United States Patent
Shankar et al.

(10) Patent No.: US 11,750,461 B2
(45) Date of Patent: Sep. 5, 2023

(54) SYSTEMS AND METHODS FOR MANAGING GROUP SERVICE PLAN TRANSACTIONS

(71) Applicant: Verizon Patent and Licensing Inc., Basking Ridge, NJ (US)

(72) Inventors: Bharatwaaj Shankar, Chennai (IN); Ishi Khamesra, Udaipur (IN); Aayushi Sinha, Kolkata (IN); Madhusudhan R. Mallu, Hyderabad (IN); Ashfaq A. Shakir, Chennai (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 196 days.

(21) Appl. No.: 17/302,883

(22) Filed: May 14, 2021

(65) Prior Publication Data

US 2022/0368593 A1 Nov. 17, 2022

(51) Int. Cl.
*H04W 4/50* (2018.01)
*H04L 41/0893* (2022.01)
*H04W 8/18* (2009.01)
*H04W 8/22* (2009.01)
*H04L 67/562* (2022.01)

(52) U.S. Cl.
CPC ........ *H04L 41/0893* (2013.01); *H04L 67/562* (2022.05); *H04W 4/50* (2018.02); *H04W 8/186* (2013.01); *H04W 8/22* (2013.01)

(58) Field of Classification Search
CPC .... H04L 41/0893; H04L 67/562; H04W 4/50; H04W 8/186; H04W 8/22
See application file for complete search history.

(56) References Cited

U.S. PATENT DOCUMENTS

| | | | | |
|---|---|---|---|---|
| 7,698,218 B1* | 4/2010 | Opaluch | ............. | G06Q 20/102 705/40 |
| 8,326,769 B1* | 12/2012 | Weisman | ............... | G06Q 50/01 707/798 |
| 2012/0173396 A1* | 7/2012 | Melby | .................. | G06Q 20/102 705/40 |
| 2012/0202446 A1* | 8/2012 | Nichols | ................... | H04W 4/02 455/466 |
| 2014/0095690 A1* | 4/2014 | Saker | ................... | H04L 65/1033 709/224 |
| 2015/0381826 A1* | 12/2015 | Marimuthu | ........... | H04M 15/78 455/405 |
| 2017/0295258 A1* | 10/2017 | Raleigh | ................. | H04W 24/02 |
| 2020/0226561 A1* | 7/2020 | Inagawa | ................ | G06Q 20/42 |

* cited by examiner

*Primary Examiner* — Barry W Taylor

(57) ABSTRACT

A transaction management platform may partition an amount associated with a group service plan into a plurality of portions. The transaction management platform may provide a graphical user interface to a primary user device of the plurality of user devices. The transaction management platform may receive, from the primary user device, a request for a transaction associated with a portion of the plurality of portions. The portion may be attributable to a secondary user device of the plurality of user devices. The transaction management platform may provide to the secondary user device of the plurality of user devices a unique link that has been generated based on one or more parameters and that enables the secondary user device to complete the transaction. Based on the secondary user device completing the transaction, the transaction management platform may process the transaction to provide an updated amount.

20 Claims, 11 Drawing Sheets

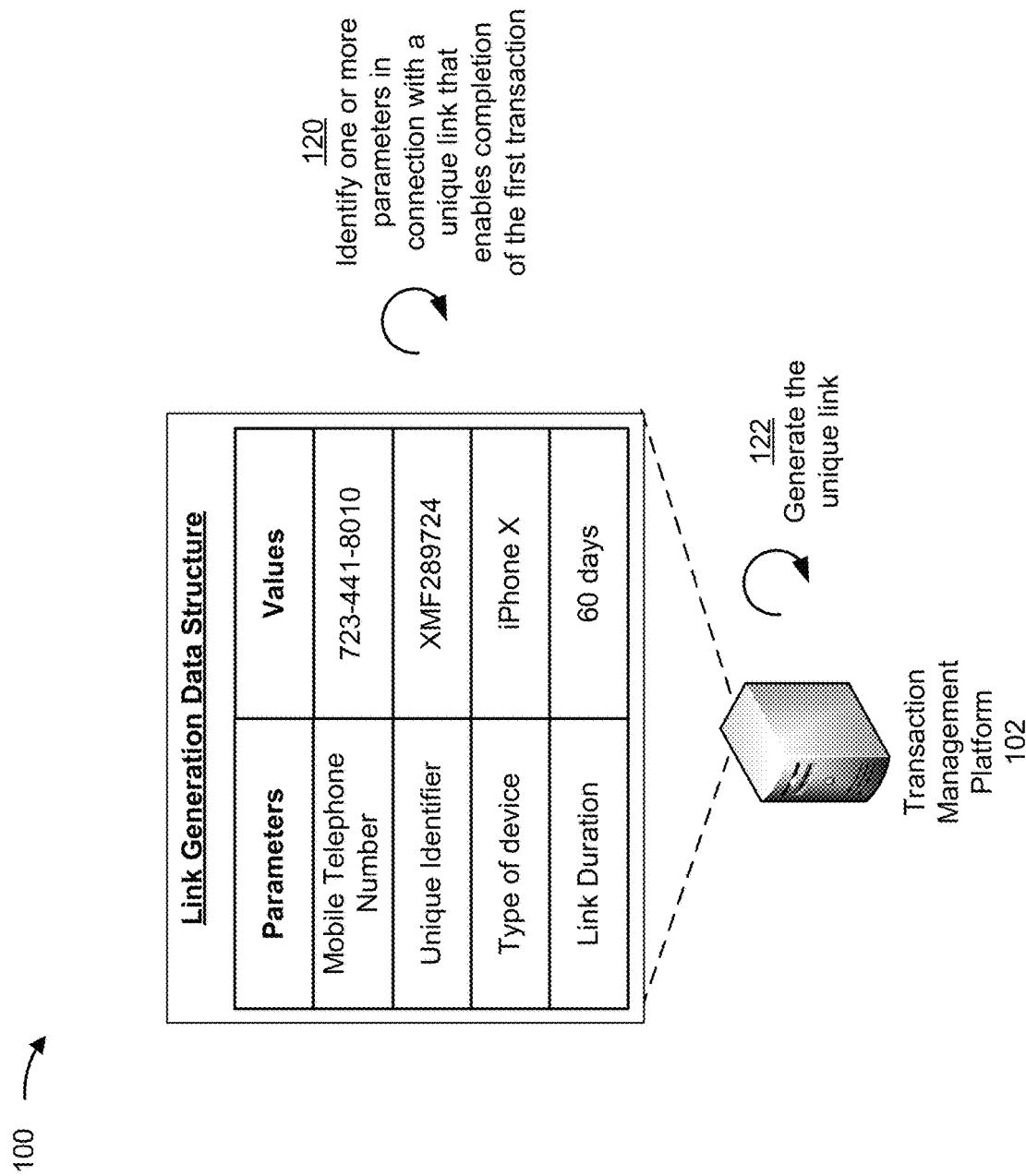

SYSTEMS AND METHODS FOR MANAGING GROUP SERVICE PLAN TRANSACTIONS

BACKGROUND

A group of individuals may sign up for a group service plan with a provider of one or more services. In such a group service plan, a primary individual of the group may be an account holder with the provider and thus be responsible for completing one or more transactions (e.g., a one-time transaction and/or recurring transactions) to enable the group to continue using the one or more services.

BRIEF DESCRIPTION OF THE DRAWINGS

FIGS. 1A-1H are diagrams of an example associated with managing group service plan transactions.

DETAILED DESCRIPTION OF PREFERRED EMBODIMENTS

Figure 1A:
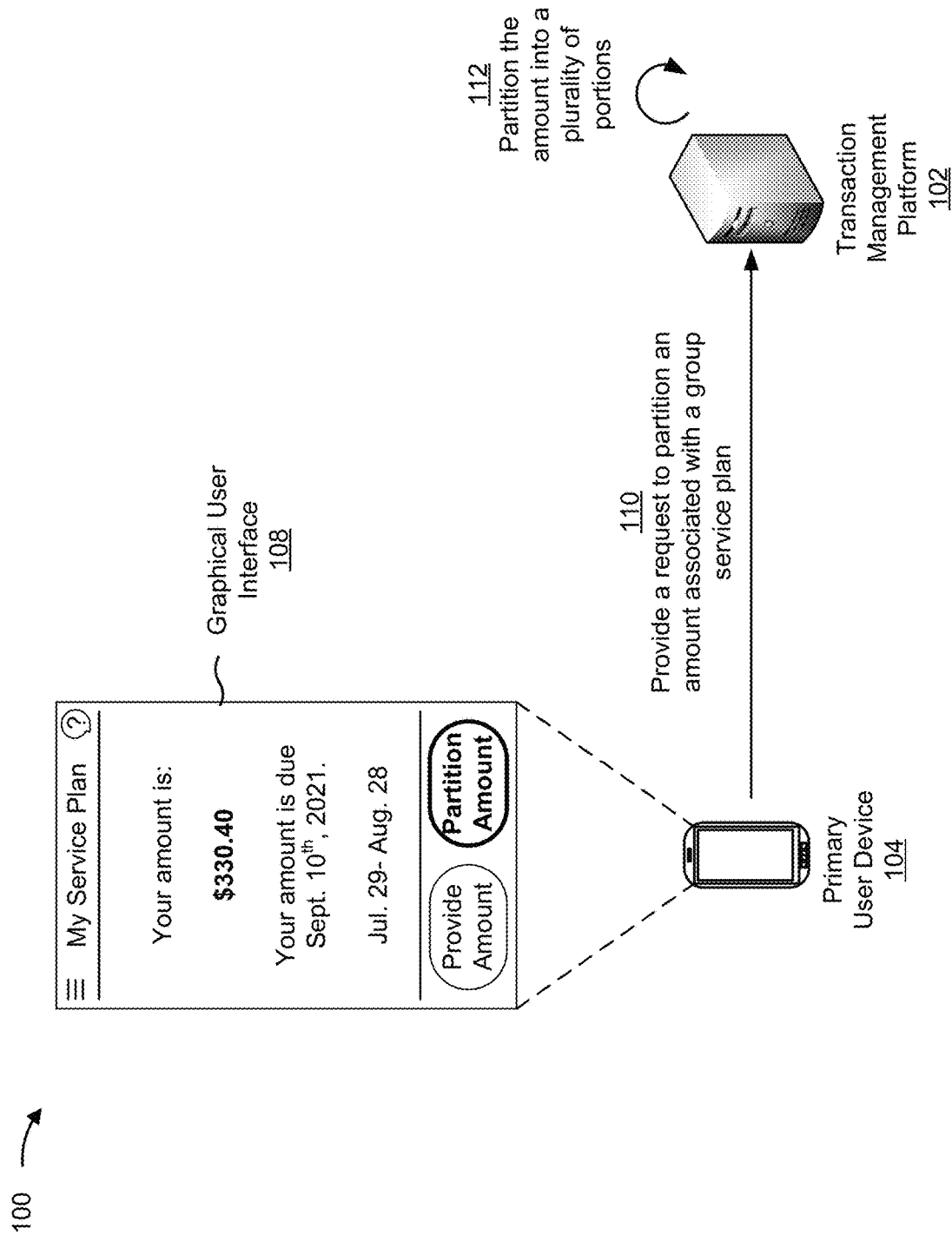

The following detailed description of example implementations refers to the accompanying drawings. The same reference numbers in different drawings may identify the same or similar elements.

To reduce individual costs associated with usage of one or more services, a plurality of individuals may group together on a single group service plan. In such a service plan, which may also be referred to as a family plan or a shared plan, one of the plurality of individuals may be an account holder with a provider of the one or more services. As the account holder, the individual may be responsible for managing an account associated with the group service plan and providing an amount on behalf of the group to enable continued use of the one or more services.

In some instances, the account holder may wish to obtain a portion of the amount from one or more other individuals of the group. For example, the one or more other individuals of the group may be adults, such as friends or family members of the account holder.

Some implementations described herein provide a device (e.g., a transaction management platform and/or a transaction management system) that facilitates the completion of transactions with respect to a group service plan. The device may partition an amount associated with a group service plan into a plurality of portions. The device may provide, to a primary user device and via a network, a graphical user interface. The graphical user interface may allow for initiation of one or more transactions relating to the plurality of portions. The device may receive, from the primary user device and after providing the graphical user interface, a request for a transaction associated with a portion of the plurality of portions. The portion may be attributable to a secondary user device. The device may provide, to the secondary user device and based on one or more parameters, a unique link that enables the secondary user device to complete the transaction. Based on the secondary user device completing the transaction, the device may process the transaction to provide an updated amount.

By utilizing unique links to manage accounts associated with group service plans, the device may reduce the burden on account holders and conserve resources that might otherwise have been consumed by devices associated with the group. For example, the device may conserve computing and/or networking resources that might otherwise have been consumed by an account holder determining portions attributable to one or more other individuals of a group (e.g., based on usage by the one or more other individuals of the one or more services, based on a prior agreement between individuals of the group, and/or the like). As a further example, the device may conserve resources (e.g., computing resources, networking resources, vehicle resources, and/or the like) that might otherwise have been consumed by the account holder and/or the one or more other individuals communicating with one another regarding the portions and/or transferring the portions (e.g., via cash payments, check payments, and/or an online banking application).

Figure 1B:
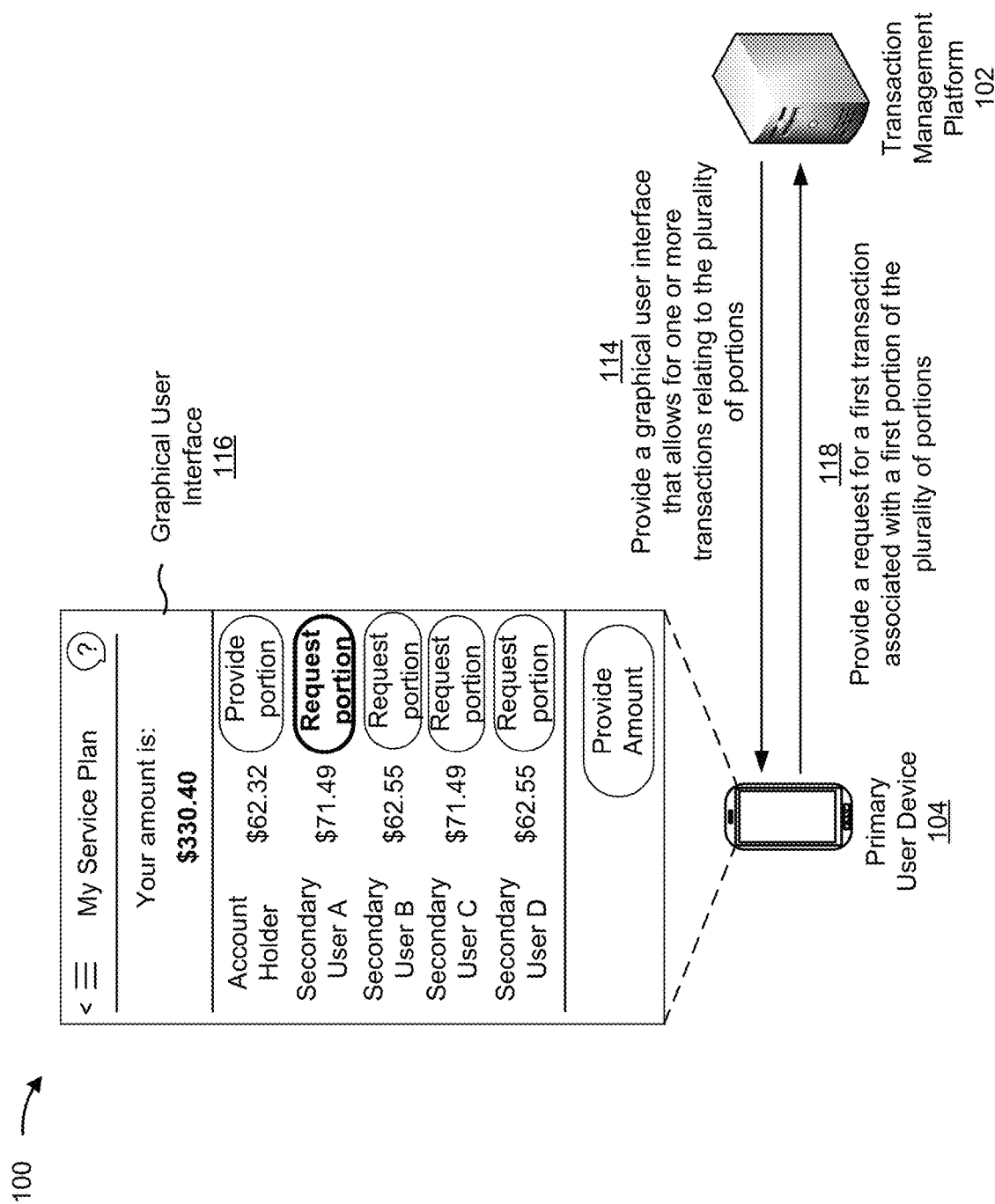
Figure 1D:
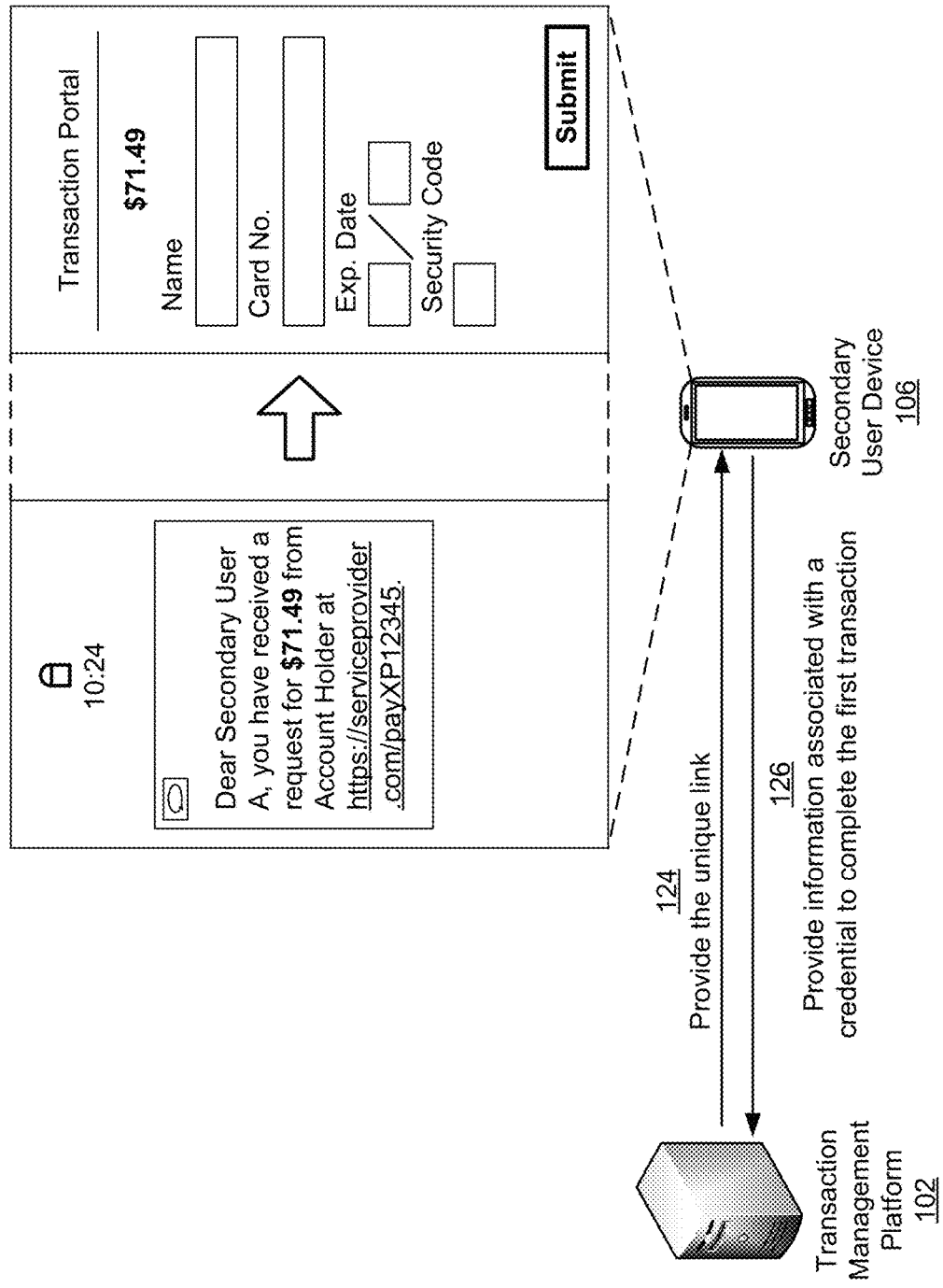
Figure 1E:
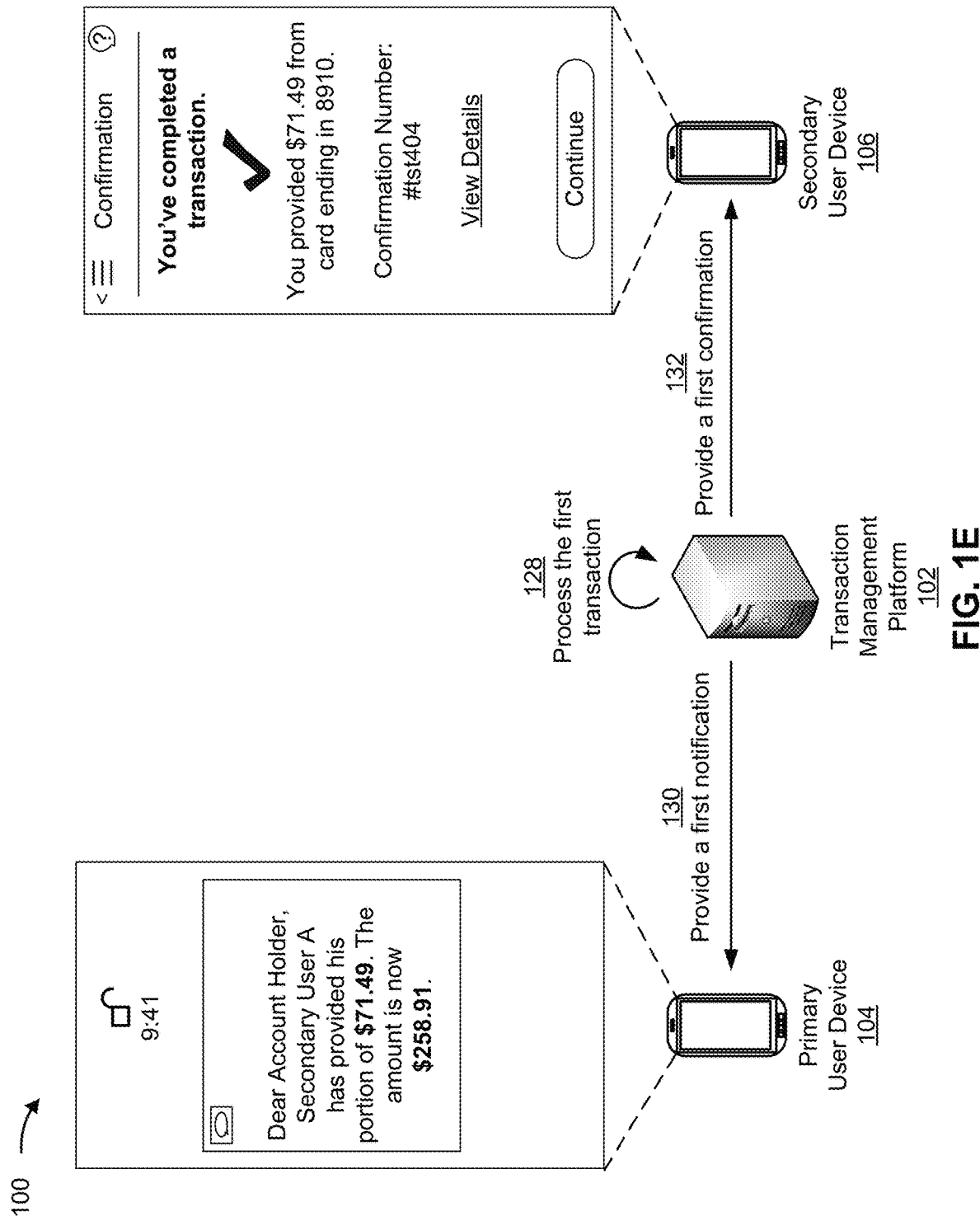
Figure 1F:
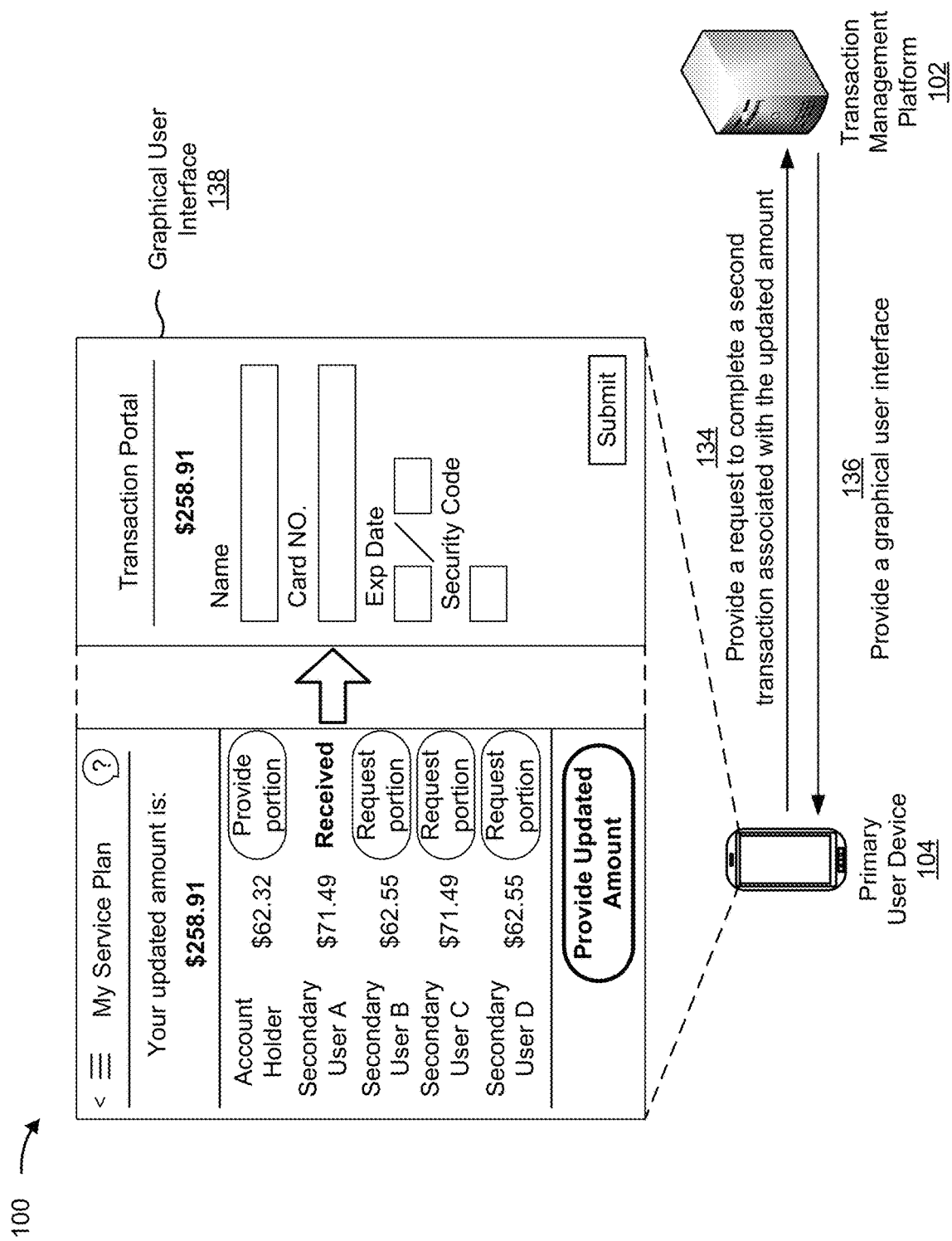
Figure 1G:
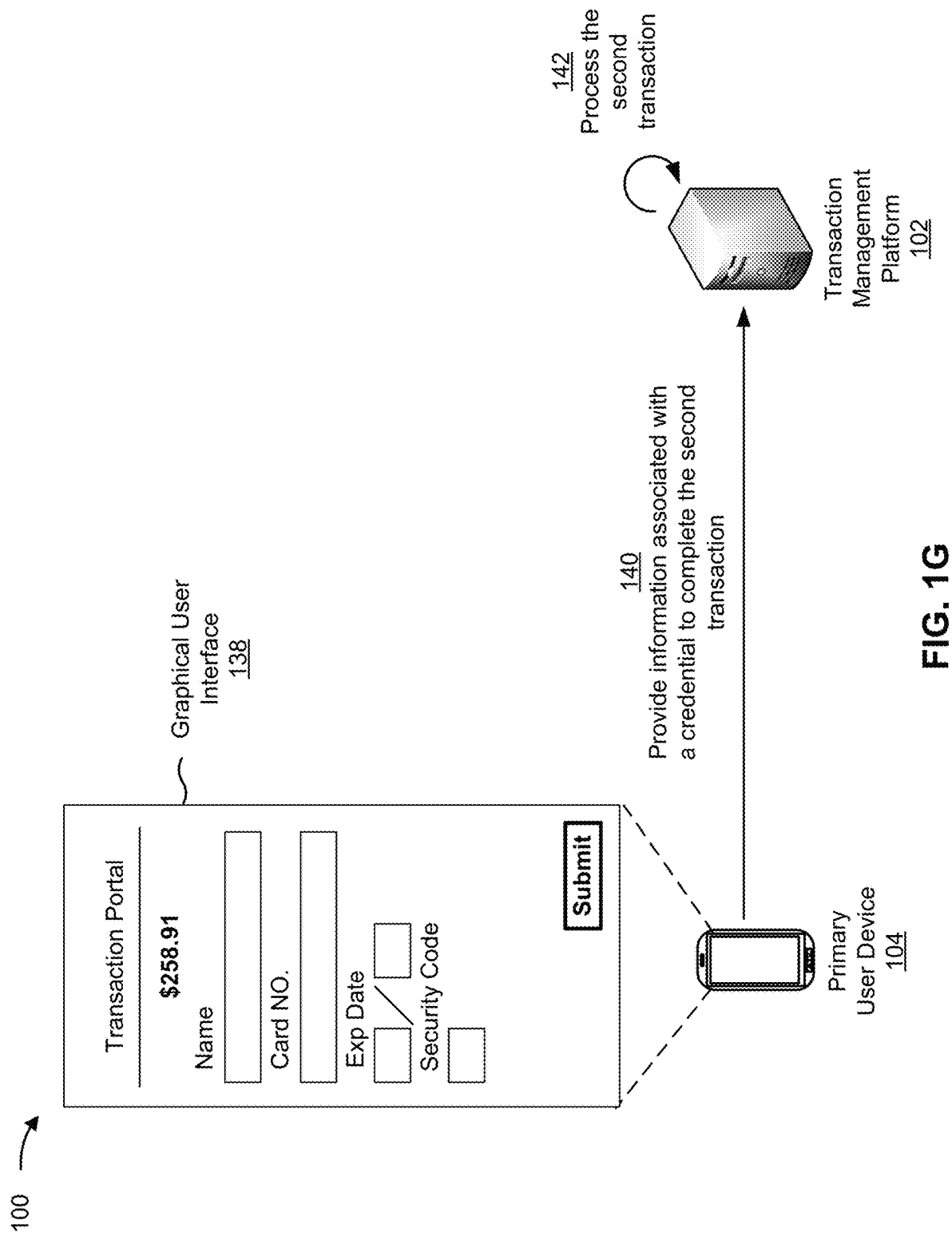
Figure 1H:
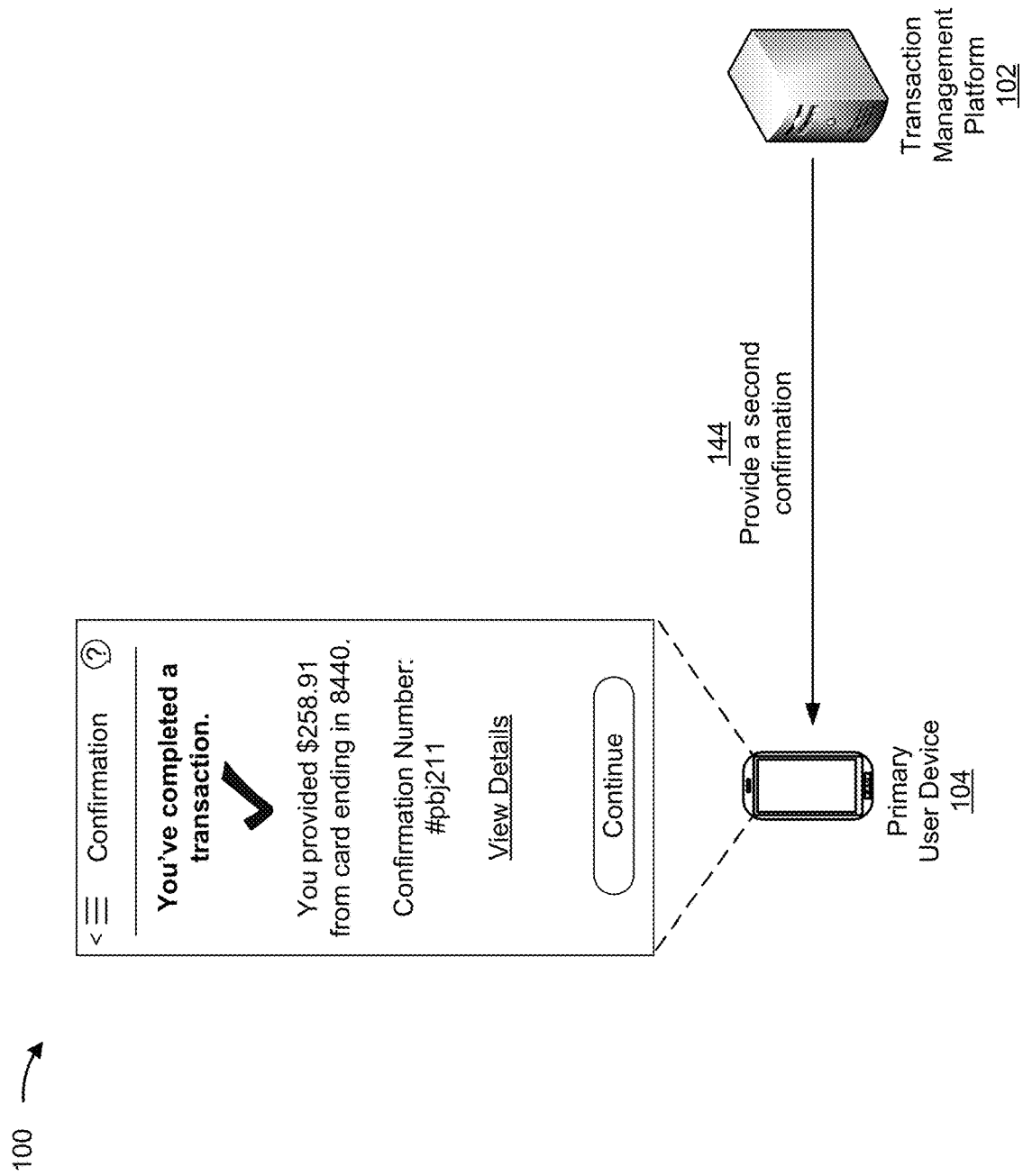

FIGS. 1A-1H are diagrams of an example 100 associated with managing group service plan transactions. As shown in FIGS. 1A-1H, example 100 includes a transaction management platform 102, a primary user device 104, and a secondary user device 106. FIGS. 1A-1E illustrate the transaction management platform 102 interacting with the primary user device 104 and the secondary user device 106 to cause the secondary user device 106 to complete a first transaction associated with a group service plan. FIGS. 1F-1H illustrate the transaction management platform 102 interacting with the primary user device 104 to cause the primary user device 104 to complete a second transaction associated with the group service plan.

In FIGS. 1A-1H, assume that an account holder is associated with the primary user device 104, a secondary user (e.g., "Secondary User A") is associated with the secondary user device 106, and additional secondary users (e.g., "Secondary User B", "Secondary User C", and "Secondary User D") are respectively associated with additional secondary user devices (not shown). Collectively, the account holder, the secondary user, and the additional secondary users may be referred to as members. Assume further that the account holder has registered for an account with a provider of one or more services (e.g., a text messaging service, a voice service, an Internet data service, an Internet service, a television service, a streaming service, an autonomous vehicle service, and/or a cloud sharing service) and signed up, on behalf of the members, for a group service plan. To sign up for the group service plan, the account holder may have provided contact information associated with the members (e.g., names, mobile telephone numbers, email addresses, and/or residential addresses) to the provider and agreed to terms of the group service plan. In some implementations, during sign up, the account holder may have provided, to the provider, demographic information associated with the members (e.g., whether one or more members are current or former military members, students, teachers, senior citizens, or members of another such group). The terms of the group service plan may indicate, for example, the one or more services being provided, a rate for the one or more services, a schedule for providing an amount based on the rate (including, for example, a time period over which the amount is tabulated and/or a deadline for providing the amount), a means for providing the amount, and/or repercussions for failure to provide the amount. Depending on the terms of the group service plan, the devices associated with the members may collectively generate different amounts from one time period to the next and/or may individually generate different portions of the amount.

In FIG. 1A, assume that the account holder has accessed the account via the primary user device 104 (e.g., by inputting login information such as an identifier and password into a website or application) after a time period (e.g., July 29-August 28). For example, the account holder may have accessed the account based on receiving a notification that an amount (e.g., $330.40) for the time period has been determined and is due by a pre-determined date (e.g., September 10). During the time period, the provider may have determined and stored respective portions of the amount attributable to the primary user device 104, the secondary user device 106, and the additional secondary user devices. Based on this determination and the account holder accessing the account, the provider may have provided a graphical user interface (GUI) 108 that inquires whether the account holder would like to provide the amount or have the amount partitioned (e.g., to obtain contributions from other members).

As shown by reference number 110 in FIG. 1A, the primary user device 104 may provide, to the transaction management platform 102, a request to partition the amount associated with the group service plan. For example, the account holder may select an option to "Partition Amount," which causes the primary user device 104 to transmit the request to the transaction management platform 102. Based on receiving the request and as shown by reference number 112, the transaction management platform 102 may partition the amount into a plurality of portions. For example, based on receiving the request, the transaction management platform 102 may obtain, from one or more data structures, information associated with usage by the members of the one or more services during the time period. The transaction management platform 102 may apply an algorithm to the information to determine the plurality of portions based on the terms of the group service agreement. As additional examples, based on receiving the request, the transaction management platform 102 may divide the amount by the quantity of members associated with the group service plan, may partition the amount based on the demographic information associated with the members (e.g., by attributing a smaller percentage of the amount to a member of a particular demographic group), may partition the amount based on how the account holder pre-configured partitioning (e.g., based on the account holder having set a fixed amount for one or more members, having selected one or more members to cover particular services, or another type of arrangement), based on sensor information or data used (e.g., distances traveled in an autonomous vehicle), and/or the like.

As shown by reference number 114 in FIG. 1B and based on partitioning the amount into the plurality of portions, the transaction management platform 102 may provide a graphical user interface 116 to the primary user device 104 that allows for one or more transactions relating to the plurality of portions. For example, the graphical user interface 116 may indicate, for each of the plurality of portions (e.g., determined to be $62.32, $71.49, $62.55, $71.49, and $62.55), an option to initiate a transaction relating to that portion. For the account holder, the option may be to provide a portion (e.g., "Provide Portion"). For any of the remaining members, the option may be to request a portion (e.g., "Request Portion"). Thus, the graphical user interface 116 may provide the account holder with flexibility in complying with the terms of the group service plan. As such, the account holder may choose to provide the full amount, provide only the portion attributable to the primary user device 104, or provide an amount between the full amount and the portion.

Based on receiving the graphical user interface 116 and as shown by reference number 118, the primary user device 104 may provide a request to the transaction management platform 102 for a first transaction associated with a first portion of the plurality of portions. For example, the account holder may select, via the primary user device 104, the option to "Request Portion" associated with "Secondary User A." In such an example, the first portion corresponds to $71.49. By selecting such an option, the account holder causes the primary user device 104 to transmit the request to the transaction management platform 102. To enable the transaction management platform 102 to communicate with the desired secondary user, the request may include the contact information associated with the secondary user obtained during account sign-up (e.g., the name of the secondary user, the mobile telephone number of the secondary user, the residential address of the secondary user, and/or the email address of the secondary user).

As shown by reference number 120 in FIG. 1C and based on receiving the request for the first transaction, the transaction management platform 102 may identify one or more parameters in connection with a unique link that enables completion of the first transaction. A list of such parameters is provided below in Table 1. The one or more parameters, which may be stored in one or more data structures (e.g., based on account sign-up, device activation, data associated with one or more sensors associated with the secondary user and/or the secondary user device 106, among other examples), may include information associated with the secondary user device 106 and/or information related to security of the unique link. For example, the one or more parameters may include a unique identifier of the secondary user device 106, a type of the secondary user device 106, a duration period of the unique link (e.g., prior to expiration of the unique link), a deep link value of the unique link, one or more alternative link values of the unique link, and/or the like. To identify at least some of one or more parameters, the transaction management platform 102 may utilize the contact information associated with the secondary user as a seed list of information to discover other associated information. For example, in some data structures (e.g., as shown in FIG. 1C), the mobile telephone number (e.g., 723-441-8010) may be associated with the unique identifier (e.g., XMF289724), the type of the secondary user device 106 (e.g., IPHONE® X), and/or the duration period of the unique link (e.g., 60 days). The duration period may be a fixed value or may be an adjustable value. For example, the transaction management platform 102 may utilize a machine learning model to tailor the duration period based on interaction between the secondary user device 106 and previously provided unique links. Thus, for example, the duration period may be shortened or lengthened if the secondary user device 106 has a historically shorter or longer response time when accessing past unique links.

To identify the deep link value parameter, which may be associated with a transaction portal within an application, the transaction management platform 102 may obtain the deep link value from a data structure. The deep link value may be identified, for example, based on the type of the secondary user device 106. To identify the one or more alternative link value parameters (e.g., to anticipate a situation in which the application is not installed on the secondary user device 106), the transaction management platform 102 may obtain the one or more alternative link values associated with application store pages and/or transaction web pages. Similar to that described above with respect to the deep link value, the one or more alternative link values may be identified based on the type of the secondary user device 106.

As shown by reference number 122 and based on identifying the one or more parameters, the transaction management platform 102 may generate the unique link. For example, the transaction management platform 102 may input the one or more parameters into an algorithm, which in turn outputs the unique link. For example, the algorithm may append the one or more parameters onto the unique link. As a further example, the algorithm may be a hash algorithm that generates the unique link having a fixed and/or reduced length. In some implementations, the transaction management platform 102 may obtain the unique link via interaction with an application programming interface (API). In such an example, the transaction management platform 102 may provide, to the API, a request that includes the one or more parameters. Based on receiving the request, the API may generate and provide the unique link to the transaction management platform 102. In some implementations, when providing the unique link, the API may provide one or more output parameters, as indicated below in Table 2. In some implementations, when generating the unique link, the transaction management platform 102 may encrypt or otherwise secure the unique link (e.g., such that only a device having the unique identifier may access the unique link). As configured, the unique link may be a dynamic uniform resource locator (URL) capable of routing the secondary user to one or more destinations associated with the deep link value and/or the alternative link values. Additionally, or alternatively, the unique link may be a single use link that may be accessed only one time and that enables completion of only the first transaction.

TABLE 1

| Input Parameters | | |
|---|---|---|
| Name | Type | Description |
| name | String | A short name associated with the unique link. |
| description | String | A description of how the unique link is to be used. |
| action | String | The action associated with the unique link. Some possible values may be AppStore, Deeplink, Web, or Webview. Default value may be Deeplink. Note: If the action is set to Web, the unique link may route users to the web experience rather than deeplinking to the application. |
| fallback | String | The fallback (e.g., alternative) experience in case the application is not installed on the user device. Some possible values may be AppStore or Web. Default value may be AppStore. |
| transactionId | String | An identifier that may be used to associate click and install requests. If no value is provided, a default identifier may be generated. |
| deeplinkId | String | The deeplink the user may be redirected to in the application or the website after accessing (e.g., clicking on) the unique link. This may be obtained from a data structure. |

TABLE 1-continued

| Input Parameters | | |
|---|---|---|
| Name | Type | Description |
| deeplink | String | The deeplink the user may be redirected to in the application after accessing (e.g., clicking on) the unique link. If present, this value may override the deeplinkID. |
| androidDeeplink | String | The deeplink the user may be redirected to in an ANDROID ® application after accessing (e.g., clicking on) the unique link. If present, this value may override the deeplinkId and/or deeplink value. |
| iosDeeplink | String | The deeplink the user may be redirected to in an IOS ® application after accessing (e.g., clicking on) the unique link. If present, this value may override the deeplinkId and/or deeplink value. |
| tabletDeeplink | String | The deeplink the user may be redirected to in a tablet application after accessing (e.g., clicking on) the unique link. If present, this value may override the deeplinkId and/or deeplink value. |
| minimumAndroidClientVersion | String | The minimum Android application version to enable deeplinking. |
| minimumIosClientVersion | String | The minimum iOS application version to enable deeplinking. |
| deepviewId | String | The identifier of an interstitial page that may be shown before redirecting the user to the Application Store if the user does not have the app installed. If no value is provided, a default interstitial page may be shown based on the configuration of the application. |
| fallbackUrl | String | The fallback (e.g., alternative) URL the user may be redirected to if the application is not installed. This may override the URL that is associated with the deeplinkId. |
| androidFallbackUrl | String | The fallback (e.g., alternative) URL the user may be redirected to if the application is not installed on an Android device. If present, this may override the URL that is associated with the deeplinkId. |
| iosFallbackUrl | String | The fallback (e.g., alternative) URL the user may be redirected to if the application is not installed on an iOS device. If present, this may override the URL that is associated with the deeplinkID. |
| windowsFallbackUrl | String | The fallback (e.g., alternative) URL the user may be redirected to if the user is on a WINDOWS ® device. If present, this may override the URL that is associated with the deeplinkID. |
| macFallbackUrl | String | The fallback (e.g., alternative) URL the user may be redirected to if the user is on a MAC ® device. If present, this may override the URL that is associated with the deeplinkID. |
| tabletFallbackUrl | String | The fallback (e.g., alternative) URL the user may be redirected to if the user is on a tablet device. If present, this may override the URL that is associated with the deeplinkID. |

TABLE 1-continued

Input Parameters

| Name | Type | Description |
| --- | --- | --- |
| channel | String | The channel in which the unique link may be used. This may include SMS, Email, social media, and/or the like. |
| appendFallback-Parameters | Boolean | This determines whether to append parameters configured for the unique link (e.g., campaign, data) the fallback URL when redirecting the user. Default value may be true. |
| deeplinkEnabled | Boolean | This determines if the deeplink in the application is enabled. Default value may be true. |
| interstitialEnabled | Boolean | This determines whether to show the interstitial if the application is not installed. Default value may be true. |
| promptToUpdate | Boolean | This determines whether to prompt the user to update their application if the application is not the minimum application version associated with the deeplink. Default value may be false. |
| updatePrompt-Message | String | The message that may be shown to the user during the prompt to update. |
| expirationDate | String | This determines the date and time the link may be set to expire. Any data that is configured in the unique link may not be appended when deeplinking the user to the application or the website after the link expires. In such a case, users trying to access an expired link may be redirected to a default page in the application or the website. The default duration period (e.g., maximum time before a link expires) may be 60 days. |
| campaign | Object | An object may contain campaign tracking parameters to measure the performance of unique links. These values may be passed along during the deeplink to the application or appended as query string parameters during a web redirect. |
| trackingId | String | A campaign tracking identifier to track link clicks. This value may be unique to a particular campaign. |
| name | String | The name of the campaign. |
| source | String | The source of the campaign. This value may be obtained from a data structure. |
| group | String | A business grouping to which the campaign belongs. This value may be obtained from a data structure. |
| expected-Transaction | String | The transaction the user is expected to complete after accessing the unique link. This value may be obtained from a data structure. |

TABLE 1-continued

Input Parameters

| Name | Type | Description |
| --- | --- | --- |
| utm | Object | An object that contains the Urchin tracking module (UTM) parameters used for tracking. This may override the default UTM parameters generated based on the unique link configuration. These values may be passed along during the deeplink to the mobile app or appended as query string parameters during a web redirect. |
| campaign | String | This may identify a specific product promotion or campaign. Default value may be the name of the campaign object passed in the request. |
| content | String | This may identify what was clicked to bring the user to the site (e.g., a banner ad, a text link, an image link). |
| medium | String | This may identify the type of link (e.g., SMS, Email). Default value may be the channel passed in the unique link request. |
| source | String | This may identify the site that sent the traffic. |
| term | String | This may identify search terms. |
| og | Object | The Open Graph (OG) definition may allow unique links to be configured to show a preview of content in certain channels, such as messaging and social media applications. |
| title | String | The title of the content. |
| text | String | A short description of the content. |
| imageUrl | String | An image to display in the preview. |
| videoUrl | String | A video to display in the preview. |
| url | String | The web URL of the content. |
| data | Character Array | Additional parameters that may be passed along when deeplinking the user into the application or the website. |
| name | String | The name of the parameter. This may be URL encoded and appended to the fallback URL when redirecting the user to the website. |
| value | Primitive Type | The value of the parameter (e.g., string, integer, double, long, boolean). This may be URL encoded and appended to the fallback URL when redirecting the user to the website. |
| type | String | This determines if the parameters may be passed to the application deeplink, website deeplink, or both. Possible values may be App, Web, All. Default value may be All. |
| secure | Boolean | This determines if the parameter may be encrypted at rest. The parameter may only be decrypted when deeplinking the user to the application or the website. |

TABLE 2

Output Parameters

| Name | Type | Description |
| --- | --- | --- |
| transactionId | String | An identifier that may be used to associate click and install requests. If no value is provided, a default identifier may be generated. |
| statusCode | Integer | A code indicating that status of the API request. |
| statusMessage | String | A descriptive message indicating the status of the API request. |
| uniqueLinkUrl | String | The unique link URL built based on the configuration sent in the API request. |
| expirationDate | String | The expiration date of the unique link. If an expiration date was included in the API request, that expiration date may be used. Otherwise, the default expiration date may be assigned to the link. |

As shown by reference number 124 in FIG. 1D and based on generating the unique link, the transaction management platform 102 may provide the unique link to the secondary user device 106. To provide the unique link, the transaction management platform 102 may generate a message that includes the unique link and transmit the message via one or more channels associated with previously-obtained contact information (e.g., the mobile telephone number, the email address, and/or the like). For example, based on previously obtaining the mobile telephone number associated with the secondary user device 106, the transaction management platform 102 may transmit, to the secondary user device 106, a short message service (SMS) message that includes the unique link, a multimedia messaging service (MMS) message that includes the unique link, and/or a rich message service (RCS) message that includes the unique link. Additionally, or alternatively, based on previously obtaining the email address of the secondary user, the transaction management platform 102 may transmit, to the secondary user device 106, an email that includes the unique link. The message may further include information about the unique link, such as the first portion requested (e.g., $71.49) and/or a reference to the member who made the request (e.g., the Account Holder). Additionally, or alternatively, the transaction management platform 102 may transmit a direct message to the secondary user device 106 (e.g., using in-application messaging).

Based on receiving the unique link, the secondary user may access the unique link, which routes the secondary user device 106 to a transaction portal. Depending on capabilities of the secondary user device 106 and the algorithm involved in generating the unique link, the unique link may route the secondary user device 106 directly or indirectly to the transaction portal, which may be located within an application or within a website. For example, assume the transaction management platform 102 established that the transaction portal within the application is a primary destination, an application store is a first alternative destination, and the transaction portal within the website is a second alternative destination. In such an example, the unique link may first attempt to route the secondary user directly to the transaction portal within the application. If the application has not been installed on the secondary user device 106, the unique link may route the secondary user to the application store to prompt the secondary user to install the application. After installation, the unique link may route the secondary user directly to the transaction portal within the application via a process such as deferred deep-linking. If the secondary user is unable to install the application or the secondary user device 106 otherwise lacks the ability to access deep links within applications, the unique link may instead route the secondary user to the transaction portal within the website.

The transaction portal, whether in the application or the website, may enable the secondary user to complete the first transaction associated with the first portion. For example, the transaction portal may identify the first portion generated by the secondary user device 106 (e.g., $71.49) and allow the secondary user to input information associated with a credential (e.g., a credit card, a payment token, an account number, biometric information, among other examples). Based on input of the information into the transaction portal and as shown by reference number 126, the secondary user device 106 may provide the information associated with the credential to the transaction management platform 102 to complete the first transaction.

As shown by reference number 128 in FIG. 1E and based on the secondary user device 106 completing the first transaction, the transaction management platform 102 may process the first transaction. For example, the transaction management platform 102 may communicate with another platform associated with the credential to authenticate or otherwise confirm completion of the first transaction. As a further example, the transaction management platform 102 may update the amount within one or more data structures associated with the group service plan to account for the first transaction. Thus, the transaction management platform 102 may subtract the first portion from the amount to provide an updated amount (e.g., $258.91).

As shown by reference number 130 and based on processing the first transaction, the transaction management platform 102 may provide a notification to the primary user device 104 that the first transaction has been processed. For example, the notification may refer to the secondary user, may refer to the first portion, and/or may provide the updated amount. To provide the notification, the transaction management platform 102 may generate and transmit a message via one or more channels associated with previously-obtained contact information (e.g., the mobile telephone number, the email address, and/or the like). For example, based on previously obtaining the mobile telephone number associated with the primary user device 104, the transaction management platform 102 may transmit, to the primary user device 104, an SMS message that includes the notification. Additionally, or alternatively, based on previously obtaining the email address of the account holder, the transaction management platform 102 may transmit, to the primary user device 104, an email that includes the notification.

As shown by reference number 132 and based on processing the first transaction, the transaction management platform 102 may provide a first confirmation to the secondary user device 106 that the first transaction has been processed. For example, the first confirmation may refer to the first portion, may refer to the credential, and/or may provide a confirmation identifier. Similar to that described above with respect to the unique link, the transaction management platform 102 may generate and transmit a message via one or more channels associated with previously-obtained contact information (e.g., the mobile telephone number, the email address, and/or the like). For example, the transaction management platform 102 may transmit, to the secondary user device 106, an SMS message that includes the first confirmation. Additionally, or alternatively, the transaction management platform 102 may transmit, to the secondary user device 106, an email that includes the first confirmation.

In FIG. 1F, assume that the account holder has re-accessed the account via the primary user device 104 (e.g., by re-inputting the login information). For example, the account holder may have re-accessed the account based on receiving the notification described above in connection with FIG. 1E. As shown by reference number 134, the primary user device 104 may provide, the transaction management platform 102, a request to complete a second transaction associated with the updated amount. For example, the account holder may select an option to "Provide Updated Amount," which causes the primary user device 104 to transmit the request to the transaction management platform 102.

As shown by reference number 136 in FIG. 1F and based on receiving the request, the transaction management platform 102 may provide a graphical user interface 138 to enable the account holder to complete the second transaction. For example, the graphical user interface 138, which may be another transaction portal, may identify the updated amount generated by the primary user device 104 and the other secondary user devices and may allow the account holder to input information associated with a credential (e.g., a credit card, a payment token, an account number, among other examples).

As shown by reference number 140 in FIG. 1G and based on input of the information into the graphical user interface 138, the primary user device 104 may provide the information associated with the credential to the transaction management platform 102 to complete the second transaction. As shown by reference number 142 and based on the primary user device 104 completing the second transaction, the transaction management platform 102 may process the second transaction. For example, similar to that described above with respect to the first transaction, the transaction management platform 102 may communicate with another platform associated with the credential to authenticate or otherwise confirm completion of the second transaction. As a further example, the transaction management platform 102 may update the amount within one or more data structures to account for the second transaction. Thus, the transaction management platform 102 may indicate receipt of the full amount, which allows the members to continue using the one or more services in accordance with the group service plan.

As shown by reference number 144 in FIG. 1H and based on processing the second transaction, the transaction management platform 102 may provide a second confirmation to the primary user device 104 that the second transaction has been processed. For example, the second confirmation may refer to the updated amount, may refer to the credential, and/or may provide a confirmation identifier. Similar to that described above, the transaction management platform 102 may generate and transmit a message via one or more channels associated with previously-obtained contact information (e.g., the mobile telephone number, the email address, and/or the like). For example, the transaction management platform 102 may transmit, to the primary user device 104, an SMS message that includes the second confirmation. Additionally, or alternatively, the transaction management platform 102 may transmit, to the primary user device 104, an email that includes the second confirmation.

While the example 100 provided above illustrates provision of the amount via completion of the first transaction and the second transaction, it should be understood that such a process is flexible and that amounts may be provided via completion of a different number of transactions. For example, the primary user device 104, rather than complete the second transaction associated with the updated amount, may instead request one or more additional transactions from other members (e.g., "Secondary User B," "Secondary User C," and/or "Secondary User D"). In such an example, the transaction management platform 102 may generate and provide respective unique links to each of the other members. As a result, the account holder may provide an amount less than the updated amount as discussed above. As a further example, the primary user device 104, rather than request the first transaction, may instead opt to complete a transaction associated with the full amount.

Additionally, while the example 100 above illustrates a sequence in which the secondary user accesses the unique link and completes the first transaction, it should be understood that in some cases, one or more secondary users may ignore the message containing the unique link or otherwise fail to complete the requested transaction. In such a case, responsibility to complete a transaction associated with the first portion may fall to the account holder. In some implementations, the transaction management platform 102 may be configured to generate and provide new unique links to the devices associated with the one or more secondary users (e.g., at a fixed frequency, at an increasing frequency, and/or the like). In some implementations, if the transaction management platform 102 determines that one or more secondary users have failed to complete transactions as requested, the transaction management platform 102 may limit use of the one or more services by the one or more secondary users (e.g., by reducing an amount of a text messages that may be sent, by reducing an amount of minutes of the voice service, by throttling the Internet data service and/or the Internet service, by limiting content available in the streaming service, by reducing available mileage in the autonomous vehicle service, by reducing processing and/or memory resources available in the cloud sharing service, among other examples).

Furthermore, while the example 100 above illustrates the account holder manually selecting options associated with requesting the first portion (shown in FIG. 1B) and providing the updated amount (as shown in FIG. 1F), it should be understood that such options may be configured to occur on a recurring basis. For example, the account holder, as the manager of the account, may interact with the transaction management platform 102 to cause the transaction management platform 102 to automatically generate and provide unique links to one or more members every time period. As a further example, the account holder may input the information associated with the credential and authorize recurring transactions associated with one or more portions of the amounts.

By utilizing unique links to manage accounts associated with a group service plan, the transaction management platform 102 may reduce the burden on account holders and conserve resources that might otherwise have been consumed by devices associated with the group. For example, the transaction management platform 102 may conserve computing and/or networking resources that might otherwise have been consumed by an account holder determining portions attributable to one or more other members of a group (e.g., based on usage by the one or more other members of the one or more services, based on a prior agreement between the members, and/or the like). As a further example, the transaction management platform 102 may conserve resources (e.g., computing resources, networking resources, vehicle resources, and/or the like) that might otherwise have been consumed by the account holder and/or the one or more other members communicating with one another regarding the portions and/or transferring the portions (e.g., via cash payments, check payments, and/or online banking applications).

As indicated above, FIGS. 1A-1H are provided as an example. Other examples may differ from what is described with regard to FIGS. 1A-1H. The number and arrangement of devices shown in FIGS. 1A-1H are provided as an example. In practice, there may be additional devices, fewer devices, different devices, or differently arranged devices than those shown in FIGS. 1A-1H. Furthermore, two or more devices shown in FIGS. 1A-1H may be implemented within a single device, or a single device shown in FIGS. 1A-1H may be implemented as multiple, distributed devices. Additionally, or alternatively, a set of devices (e.g., one or more devices) shown in FIGS. 1A-1H may perform one or more functions described as being performed by another set of devices shown in FIGS. 1A-1H.

Figure 2:
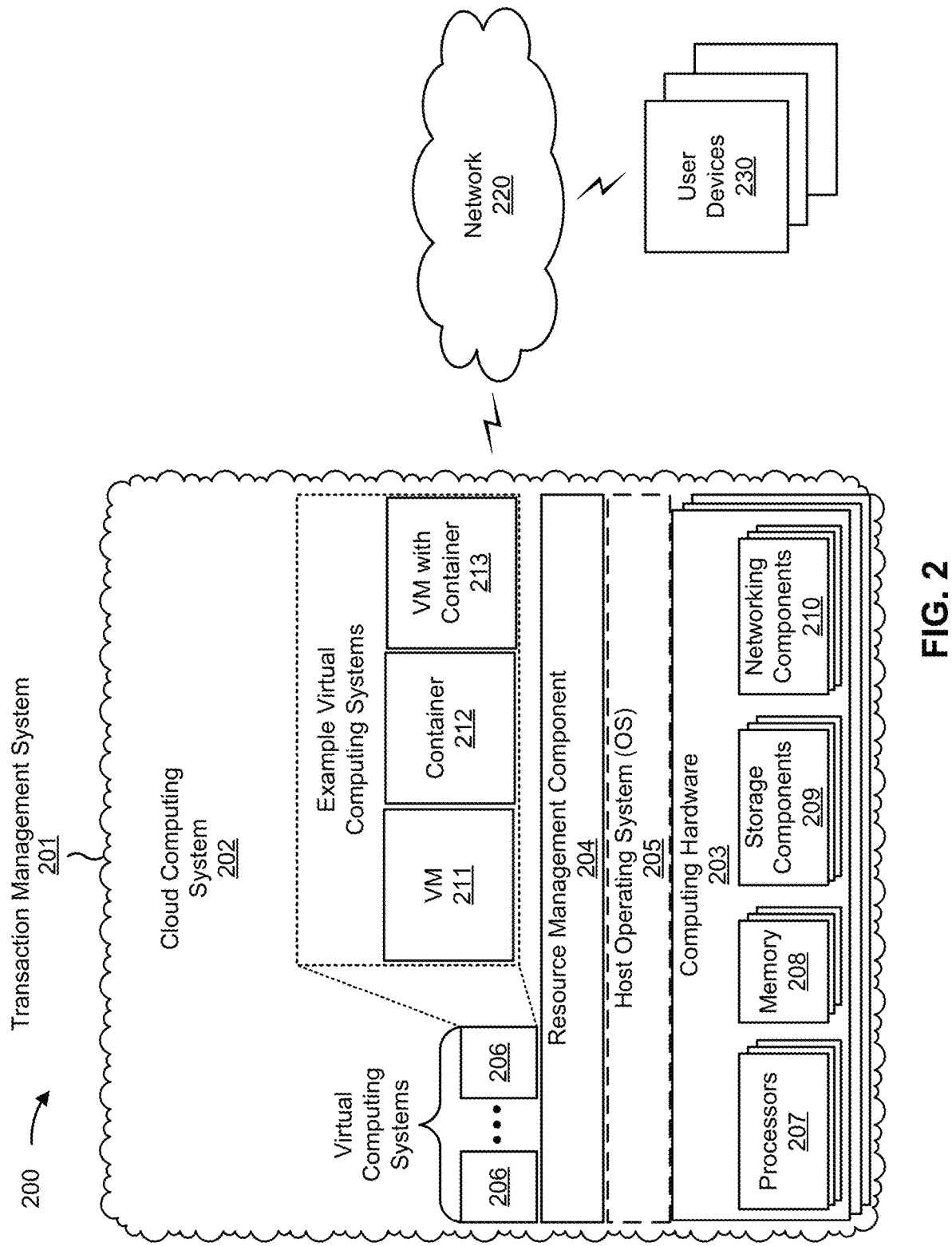
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a transaction management system 201, which may correspond to the transaction management platform 102. The transaction management system 201 may include one or more elements of and/or may execute within a cloud computing system 202. The cloud computing system 202 may include one or more elements 203-213, as described in more detail below. As further shown in FIG. 2, environment 200 may include a network 220 and/or user devices 230. Devices and/or elements of environment 200 may interconnect via wired connections and/or wireless connections.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine (VM) 211, a container 212, or a hybrid environment 213 that includes a VM and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although the transaction management system 201 may include one or more elements 203-213 of the cloud computing system 202, may execute within the cloud computing system 202, and/or may be hosted within the cloud computing system 202, in some implementations, the transaction management system 201 may not be cloud-based (e.g., may be implemented outside of a cloud computing system) or may be partially cloud-based. For example, the transaction management system 201 may include one or more devices that are not part of the cloud computing system 202, such as device 300 of FIG. 3, which may include a standalone server or another type of computing device. The transaction management system 201 may perform one or more operations and/or processes described in more detail elsewhere herein.

Network 220 includes one or more wired and/or wireless networks. For example, network 220 may include a cellular network, a public land mobile network (PLMN), a local area network (LAN), a wide area network (WAN), a private network, the Internet, and/or a combination of these or other types of networks. The network 220 enables communication among the devices of environment 200.

The user devices 230 include user equipment capable of receiving, generating, storing, processing, and/or providing information, such as information described herein. For example, the user devices 230, which may include the primary user device 104, the secondary user device 106, and/or one or more other secondary user devices, may include a computer (e.g., a desktop computer, a laptop computer, a tablet computer, a handheld computer, a server device, etc.), a mobile phone (e.g., a smart phone, a radiotelephone, etc.), an internet of things (IoT) device or smart appliance, or a similar device. The user devices 230 may receive information, send information, or otherwise be associated with a group service plan.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
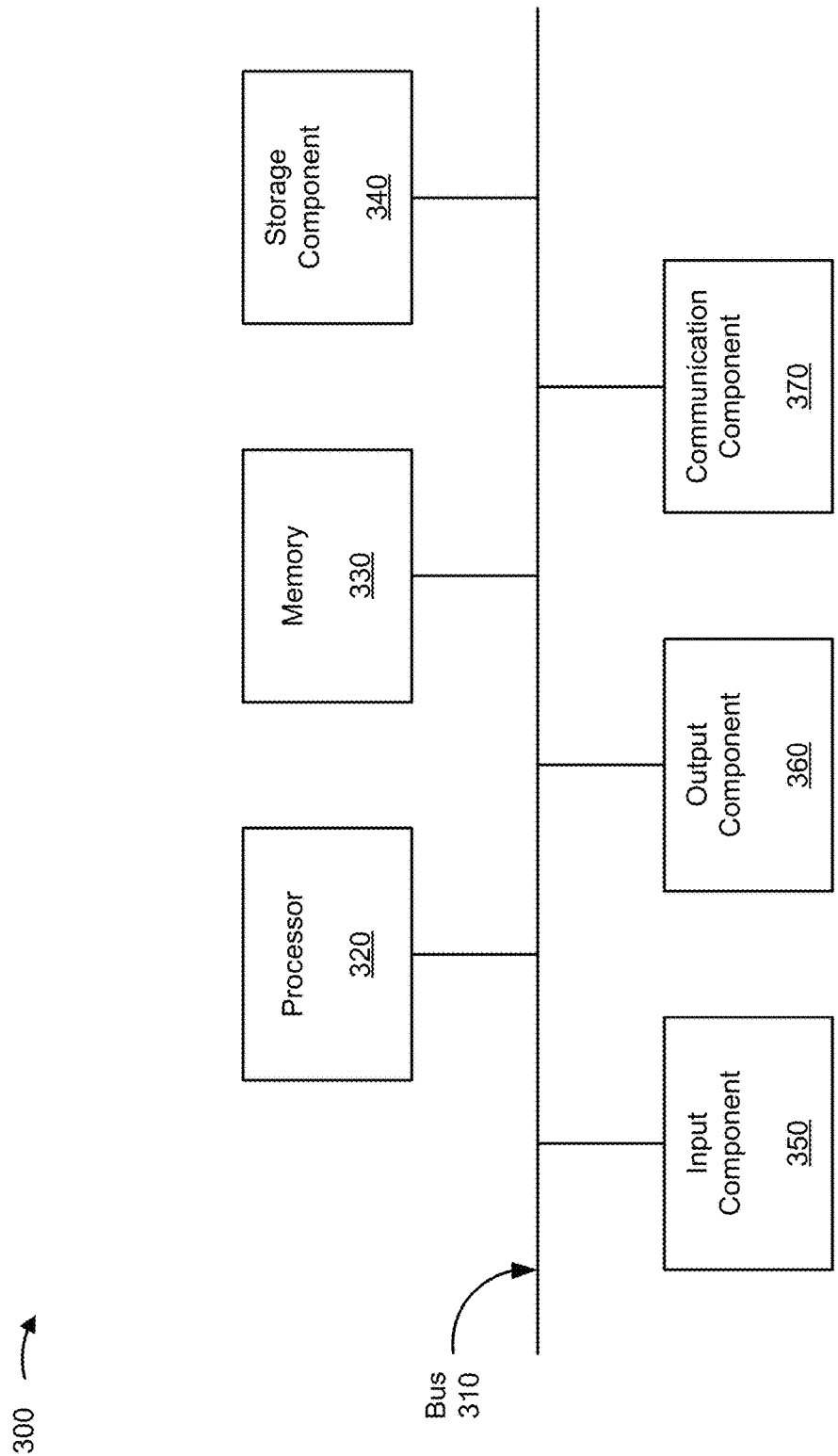
FIG. 3 is a diagram of example components of one or more devices of FIG. 2.

FIG. 3 is a diagram of example components of a device 300, which may correspond to the transaction management system 201 and/or one or more of the user devices 230. In some implementations, the transaction management system 201 and/or the one or more of the user devices 230 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
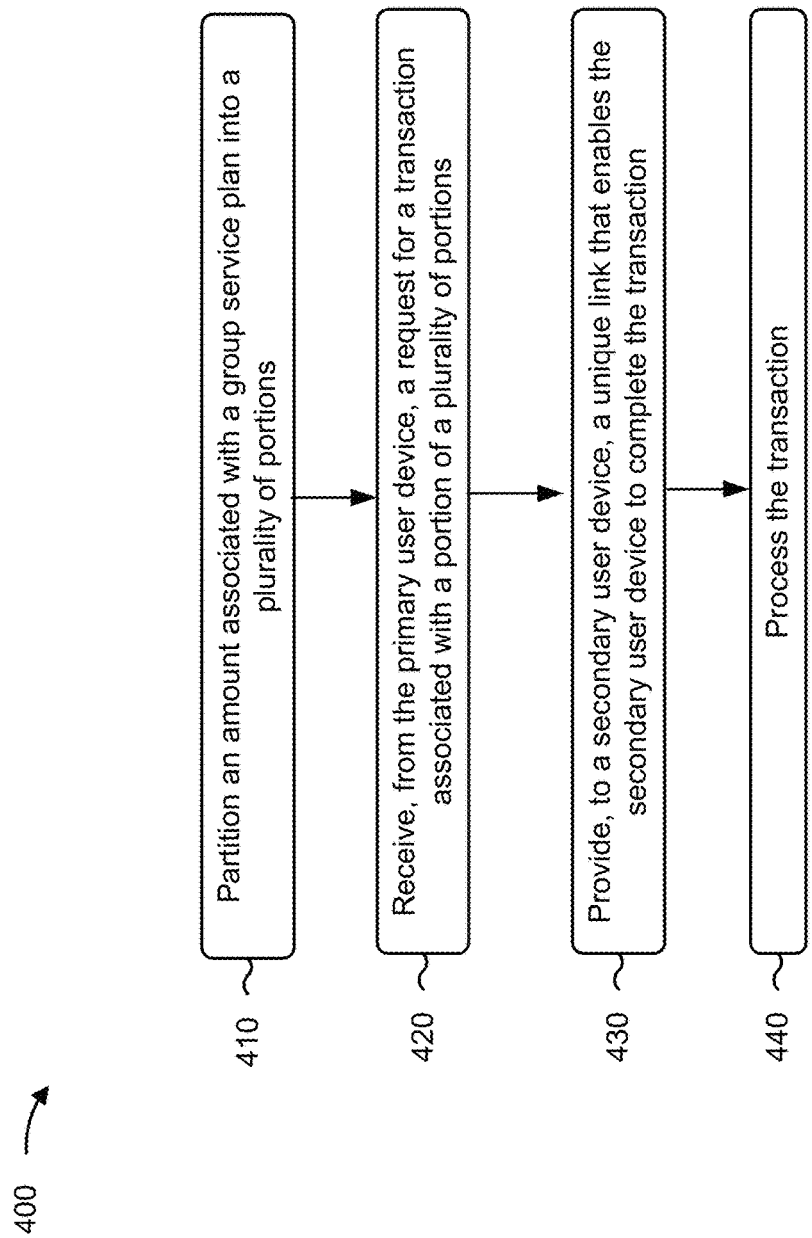
FIG. 4 is a flowchart of an example process relating to managing group service plan transactions.

FIG. 4 is a flowchart of an example process 400 associated with managing group service plan transactions. In some implementations, one or more process blocks of FIG. 4 may be performed by a transaction management system (e.g., the transaction management system 201 and/or the transaction management platform 102). In some implementations, one or more process blocks of FIG. 4 may be performed by another device or a group of devices separate from or including the transaction management platform, such as a user device (e.g., a user device 230, a primary user device 104, a secondary user device 106, and/or another secondary user device). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include partitioning an amount associated with a group service plan into a plurality of portions (block 410). For example, the transaction management platform may partition an amount associated with a group service plan into a plurality of portions, as described above. The group service plan may allow a plurality of user devices to use one or more services in exchange for provision of the amount. The plurality of user devices may include a primary device, a secondary device, and/or another secondary user device. Process 400, prior to partitioning the amount, may further includer receiving, from the primary user device of the plurality of user devices, a request to partition the amount associated with the group service plan into the plurality of portions. The primary user device may be associated with an account holder who has an account with a provider of the group service plan. After partitioning the amount, process 400 may further include providing to the primary user device of the plurality of user devices, and via a network, a graphical user interface. Providing the graphical user interface may be based on partitioning the amount into the plurality of portions. The graphical user interface may allow for initiation of one or more transactions relating to the plurality of portions. The graphical user interface may be a first graphical user interface.

As further shown in FIG. 4, process 400 may include receiving from the primary user device a request for a transaction associated with a portion of the plurality of portions (block 420). For example, the transaction management platform may receive from the primary user device a request for a transaction associated with a portion of the plurality of portions, as described above. Receiving the request may be after providing the graphical user interface. The portion may attributable to the secondary user device of the plurality of user devices. The portion may have been determined based on usage by the secondary user device of the one or more services during a time period. The request may be a first request. The transaction may be a first transaction. The portion may be a first portion. Process 400 may further include identifying, based on receiving the request, one or more parameters in connection with a unique link. The one or more parameters may be one or more first parameters. The unique link may be a first unique link. The unique link may be a single use link that enables completion of only the transaction associated with the portion. The unique link may be a single use link that expires after a set amount of time in accordance with the one or more parameters. The one or more parameters may include at least one of a unique identifier of the secondary user device, a type of the secondary user device, or an expiration date of the unique link. The one or more parameters may be associated with security of the unique link. Process 400 may further include generating, based on identifying the one or more parameters, the unique link.

As further shown in FIG. 4, process 400 may include providing to the secondary user device of the plurality of user devices the unique link that enables the secondary user device to complete the transaction (block 430). For example, the transaction management platform may provide to the secondary user device of the plurality of user devices the unique link that enables the secondary user device to complete the transaction, as described above. Providing the unique link may be based on generating the unique link.

Providing the unique link may include transmitting, to the secondary user device, a short message service message that includes the unique link.

As further shown in FIG. 4, process 400 may include processing the transaction (block 440). For example, the transaction management platform may process, as described above. Processing the transaction may be based on the secondary user device completing the transaction and may be to provide an updated amount. The updated amount may be a first updated amount.

Process 400 may further include receiving, from the primary user device, and after providing the graphical user interface, a second request for a second transaction associated with a second portion of the plurality of portions, wherein the second portion is attributable to the other secondary user device of the plurality of user devices, identifying, based on receiving the second request, one or more second parameters in connection with a second unique link that enables the other secondary user device to complete the second transaction, generating, based on identifying the one or more second parameters, the second unique link, providing, to the other secondary user device of the plurality of user devices and based on identifying the one or more second parameters, the second unique link, and processing, based on the other secondary user device completing the second transaction, the second transaction to provide a second updated amount. The second unique link may be different than the first unique link.

Process 400 may further include receiving, from the primary user device, and after providing the first graphical user interface, a third request to complete a third transaction associated with a third portion of the plurality of portions, providing, to the primary user device and based on receiving the third request, a second graphical user interface, wherein the second graphical user interface enables the primary user device to complete the third transaction, and processing, based on the primary user device completing the third transaction, the third transaction to indicate receipt of the amount.

Process 400 may further include receiving, from the primary user device, and after providing the first graphical user interface, a second request to complete a second transaction associated with one or more additional portions of the plurality of portions, providing, to the primary user device and based on receiving the second request, a second graphical user interface, wherein the second graphical user interface enables the primary user device to complete the second transaction, and processing, based on primary user device completing the second transaction, the second transaction to indicate receipt of the amount. The one or more additional portions may include a second portion and a third portion. The second portion may have been determined based on based on usage by the primary user device of the one or more services during the time period, and the third portion may have been determined based on usage by another secondary user device of the plurality of user devices of the one or more services during the time period.

Process 400 may further include providing, to the secondary user device and based on processing the transaction, a confirmation that indicates that the transaction has been processed.

Process 400 may further include providing, to the primary user device and based on processing the transaction, a notification that indicates that the transaction has been processed.

Process 400 may further include receiving, from the primary user device, and after providing the first graphical user interface, a third request to complete a second transaction associated with a second portion of the plurality of portions, providing, to the primary user device and based on receiving the third request, a second graphical user interface, wherein the second graphical user interface enables the primary user device to complete the second transaction, and processing, based on primary user device completing the second transaction, the second transaction to provide a second updated amount.

Process 400 may include receiving, from the primary user device, and after providing the graphical user interface, a third request for a second transaction associated with a second portion of the plurality of portions, providing, to another secondary user device of the plurality of user devices, and based on receiving the third request, a second unique link, wherein the second unique link enables the other secondary user device to complete the second transaction, and wherein the second unique link is generated based on one or more second parameters, wherein the one or more second parameters include at least one of a unique identifier of the other secondary user device, a type of the other secondary user device, or an expiration date of the second unique link, and processing, based on the other secondary user device completing the second transaction, the second transaction to indicate receipt of the amount.

Process 400 may further include receiving, from the primary user device, and after providing the graphical user interface, a second request for a second transaction associated with a second portion of the plurality of portions, wherein the second portion was determined based on usage by the other secondary user device of the one or more services during the time period, providing, to the other secondary user device, and based on receiving the second request, a second unique link that is different than the first unique link, wherein the second unique link enables the other secondary user device to complete the second transaction, and wherein the second unique link has been generated based one or more second parameters, wherein the one or more second parameters include at least one of a unique identifier of the other secondary user device, a type of the secondary user device, or an expiration date of the second unique link, and processing, based on the other secondary user device completing the second transaction, the second transaction to provide a second updated amount.

Process 400 may further include receiving, from the primary user device, and after providing the first graphical user interface, a second request to complete a second transaction associated with a second portion of the plurality of portions, wherein the second portion was determined based on usage by the primary user device of the one or more services during the time period, providing, to the primary user device and based on receiving the second request, a second graphical user interface, wherein the second graphical user interface enables the primary user device to complete the second transaction, and processing, based on primary user device completing the second transaction, the second transaction to provide the second updated amount.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    partitioning, by a device, an amount associated with a group service plan based on determining respective portions of the amount attributable to each of a plurality of user devices that use one or more services associated with the group service plan;
    providing, by the device, to a primary user device that uses the one or more services associated with the group service plan, a graphical user interface;
    receiving, by the device and from the primary user device, a request for a transaction for a portion of the amount that is attributable to a secondary user device that uses the one or more services associated with the group service plan;
    generating, by the device, a unique link based on one or more parameters associated with the secondary user device;
    providing, by the device and to the secondary user device, the unique link; and
    processing, by the device, the transaction to provide an updated amount.

2. The method of claim 1, wherein
    the request is a first request, the transaction is a first transaction, the portion is a first portion, the one or more parameters are one or more first parameters, and the unique link is a first unique link; and
    the method further comprises:
        receiving, from the primary user device, and after providing the graphical user interface, a second request for a second transaction associated with a second portion of the amount,
            wherein the second portion is attributable to another secondary user device that uses the one or more services associated with the group service plan.

3. The method of claim 2, further comprising:
    generating a second unique link based on one or more second parameters,
        wherein the second unique link is different than the first unique link.

4. The method of claim 1, further comprising:
    receiving, from the primary user device, and after providing the graphical user interface, a second request to complete a second transaction associated with one or more additional portions of the amount;
    providing, to the primary user device and based on receiving the second request, a second graphical user interface,
        wherein the second graphical user interface enables the primary user device to complete the second transaction; and
    processing, based on primary user device completing the second transaction, the second transaction to indicate receipt of the amount.

5. The method of claim 4, wherein
    the portion includes a first portion, which was determined based on usage by the secondary user device of the one or more services during a time period; and
    the one or more additional portions include a second portion that was determined based on usage by the primary user device of the one or more services during the time period.

6. The method of claim 1, wherein providing the unique link includes transmitting, to the secondary user device, a message that includes the unique link.

7. A device, comprising:
one or more processors configured to:
receive, from a primary user device of a plurality of user devices that use one or more services associated with a group service plan, a first request to partition an amount associated with the group service plan, the amount being partitioned based on determining respective portions of the amount attributable to each of the plurality of user devices;
provide, to the primary user device, via a network, and based on partitioning the amount, a graphical user interface,
wherein the graphical user interface allows for initiation of one or more transactions relating to the respective portions;
receive, from the primary user device, a second request for a transaction for a portion of the amount that is attributable to a secondary user device that uses the one or more services associated with the group service plan;
provide, to the secondary user device and based on receiving the second request, a unique link,
wherein the unique link enables the secondary user device to complete the transaction, and
wherein the unique link has been generated based on one or more parameters,
wherein the one or more parameters include at least one of:
a unique identifier of the secondary user device,
a type of the secondary user device, or
an expiration date of the unique link; and
process, based on the secondary user device completing the transaction, the transaction to provide an updated amount.

8. The device of claim 7, wherein partitioning the amount is based on at least one of:
usage of the one or more services during a time period; or
a pre-configuration of an account associated with the group service plan.

9. The device of claim 7, wherein the one or more processors are further configured to:
provide, to the secondary user device and based on processing the transaction, a confirmation that indicates that the transaction has been processed.

10. The device of claim 7, wherein the one or more processors are further configured to:
provide, to the primary user device and based on processing the transaction, a notification that indicates that the transaction has been processed.

11. The device of claim 7, wherein
the graphical user interface is a first graphical user interface, the transaction is a first transaction, the portion is a first portion of the amount, and the updated amount is a first updated amount; and
the one or more processors are further configured to:
receive, from the primary user device, and after providing the first graphical user interface, a third request to complete a second transaction associated with a second portion of the amount;
provide, to the primary user device and based on receiving the third request, a second graphical user interface,
wherein the second graphical user interface enables the primary user device to complete the second transaction; and
process, based on primary user device completing the second transaction, the second transaction to provide a second updated amount.

12. The device of claim 7, wherein the one or more parameters are associated with security of the unique link.

13. The device of claim 7, wherein the unique link is a single use link that enables completion of only the transaction associated with the portion.

14. The device of claim 7, wherein the one or more parameters include:
the unique identifier of the secondary user device,
the type of the secondary user device, and
the expiration date of the unique link.

15. A non-transitory computer-readable medium storing a set of instructions, the set of instructions comprising:
one or more instructions that, when executed by one or more processors of a device, cause the device to:
provide, via a network and to a primary user device of a plurality of user devices that use one or more services associated with a group service plan, a graphical user interface associated with the group service plan, the graphical user interface being based on determining respective portions of an amount associated with the group service plan, the respective portions attributable to each of the plurality of user devices,
wherein the graphical user interface allows for initiation of one or more transactions relating to portions of the amount;
receive, from the primary user device, and after providing the graphical user interface, a request for a transaction for a portion of the amount that is attributable to a secondary user device that uses the one or more services associated with the group service plan;
provide, to the secondary user device, and based on receiving the request, a unique link,
wherein the unique link enables the secondary user device to complete the transaction, and
wherein the unique link is generated based on one or more parameters,
wherein at least one parameter of the one or more parameters is uniquely associated with the secondary user device; and
process, based on the secondary user device completing the transaction, the transaction to provide an updated amount.

16. The non-transitory computer-readable medium of claim 15, wherein the one or more services include at least one of a text messaging service, a voice service, or an internet data service.

17. The non-transitory computer-readable medium of claim 15, wherein the unique link is a single use link that expires after a set amount of time in accordance with the one or more parameters.

18. The non-transitory computer-readable medium of claim 15, wherein the portion was determined based on usage by the secondary user device of the one or more services during a time period.

19. The non-transitory computer-readable medium of claim 18, wherein
the graphical user interface is a first graphical user interface, the request is a first request, the transaction is a first transaction, the portion is a first portion, and the updated amount is a first updated amount; and
the one or more instructions, when executed by the one or more processors, further cause the device to:
receive, from the primary user device, and after providing the first graphical user interface, a second request to complete a second transaction associated with a second portion of the amount, wherein the second portion was determined based on usage by the primary user device of the one or more services during the time period;

provide, to the primary user device and based on receiving the second request, a second graphical user interface,
  wherein the second graphical user interface enables the primary user device to complete the second transaction; and process, based on primary user device completing the second transaction, the second transaction to provide a second updated amount.

20. The non-transitory computer-readable medium of claim 15, wherein
the graphical user interface is a first graphical user interface, the request is a first request, the transaction is a first transaction, the portion is a first portion, and the updated amount is a first updated amount; and
the one or more instructions, when executed by the one or more processors, further cause the device to:

receive, from the primary user device, and after providing the first graphical user interface, a second request to complete a second transaction associated with a second portion of the amount;

provide, to the primary user device and based on receiving the second request, a second graphical user interface,
  wherein the second graphical user interface enables the primary user device to complete the second transaction; and process, based on primary user device completing the second transaction, the second transaction to provide a second updated amount.

* * * * *